US008554293B2

(12) United States Patent
Lee

(10) Patent No.: US 8,554,293 B2

(45) Date of Patent: Oct. 8, 2013

(54) MOBILE TERMINAL AND ANTENNA CONNECTION CABLE THEREOF

(75) Inventor: Han Bin Lee, Seoul (KR)

(73) Assignee: LG Electronics Inc., Seoul (KR)

(*) Notice: Subject to any disclaimer, the term of this patent is extended or adjusted under 35 U.S.C. 154(b) by 735 days.

(21) Appl. No.: 12/563,965

(22) Filed: Sep. 21, 2009

(65) Prior Publication Data

US 2010/0081491 A1 Apr. 1, 2010

(30) Foreign Application Priority Data

Oct. 1, 2008 (KR) ........................ 10-2008-0096797

(51) Int. Cl.
*H04B 1/38* (2006.01)

(52) U.S. Cl.
USPC .................................... 455/575.7; 455/67.11

(58) Field of Classification Search
None
See application file for complete search history.

(56) References Cited

U.S. PATENT DOCUMENTS

| | | | | |
|---|---|---|---|---|
| 5,577,269 A * | 11/1996 | Ludewig | .................... | 455/575.7 |
| 5,659,888 A * | 8/1997 | Kato et al. | ................. | 455/575.7 |
| 6,556,812 B1 * | 4/2003 | Pennanen et al. | ............. | 343/702 |
| 2002/0098810 A1 * | 7/2002 | Murakami | ....................... | 455/90 |
| 2003/0133281 A1 * | 7/2003 | Nakamura et al. | ............ | 361/814 |
| 2004/0192222 A1 * | 9/2004 | Vaisanen et al. | ................ | 455/78 |
| 2007/0060089 A1 * | 3/2007 | Owen et al. | ................... | 455/229 |
| 2010/0061279 A1 * | 3/2010 | Knudsen et al. | .............. | 370/278 |

* cited by examiner

*Primary Examiner* — Marcos Batista
*Assistant Examiner* — Frank Donado
(74) *Attorney, Agent, or Firm* — Lee, Hong, Degerman, Kang & Waimey

(57) ABSTRACT

Provided are a mobile terminal and an antenna connection device of the mobile terminal which can reduce the number of connection paths between an antenna and a wireless communication unit and can thus minimize path loss. The mobile terminal may include a body including a first case in which an antenna is disposed and a second case in which a wireless communication unit is disposed; a mobile switch which is disposed in the second case and serves as a radio frequency (RF) input/output (I/O) port for the wireless communication unit; and an antenna connection cable which is formed in one body with the antenna and includes a connector formed at one end of the antenna connection cable, the antenna connection able being connected to the mobile switch via the connector.

4 Claims, 10 Drawing Sheets

MOBILE TERMINAL AND ANTENNA CONNECTION CABLE THEREOF

CROSS-REFERENCE TO RELATED APPLICATION

Pursuant to 35 U.S.C. §119(a), this application claims the benefit of earlier filing date and right of priority to Korean Patent Application No. 10-2008-0096797, filed on Oct. 1, 2008, the contents of which are hereby incorporated by reference herein in its entirety.

BACKGROUND OF THE INVENTION

1. Field of the Invention

The present invention relates to a mobile terminal and an antennal connection cable thereof, which can minimize path loss and insertion loss, improve mechanical reliability and reduce manufacturing cost by minimizing the number of paths between an antenna and a radio frequency (RF) input terminal.

2. Description of the Related Art

Due to recent trends to smaller and slimmer mobile terminals, more antennas are being designed to be embedded in mobile terminals, rather than being exposed outside mobile terminals. Most mobile terminals are small enough to be held in hands, and are generally used while being gripped by their users' hands. Thus, most antennas for use in mobile terminals are disposed at the ends of the main bodies of mobile terminals in order to prevent the reception and transmission of signals from being interfered with by the users' hands.

However, it is generally difficult to find a proper position for an antenna inside a mobile terminal. In most cases, an antenna is disposed a predetermined distance apart from a printed circuit board (PCB) in a mobile terminal. In order to connect the antenna and the PCB, a feeding point may be provided in the mobile terminal, and may be connected to the antenna. In addition, the feeding point may be connected to a wireless communication unit of the mobile terminal by a coaxial cable. In order to connect the feeding point and the wireless communication unit, a mobile switch having the shape of a coaxial cable socket may be provided at the feeding point. The coaxial cable may connect a mobile switch of the wireless communication unit, which serves as an input/output (I/O) port for the wireless communication unit, and the mobile switch at the feeding point. In this case, since the antenna and the wireless communication unit are connected indirectly via a plurality of connection nodes (i.e., the feeding point, the mobile switch at the feeding point, the coaxial cable, and the mobiles switch of the wireless communication unit), insertion loss may occur at the mobile switch at the feeding point and the mobile switch of the wireless communication unit, respectively, and path loss may occur along the connection path between the antenna and the wireless communication unit.

SUMMARY OF THE INVENTION

The present invention provides a mobile terminal and an antennal connection cable thereof, which can minimize path loss and insertion loss by minimizing the number of paths between an antenna and a radio frequency (RF) input terminal.

The present invention also provides a mobile terminal and an antennal connection cable thereof, which can improve mechanical reliability and reduce manufacturing cost by simplifying the connection between a wireless communication unit and an antenna.

According to an aspect of the present invention, there is provided a mobile terminal including a body including a first case in which an antenna is disposed and a second case in which a wireless communication unit is disposed; a mobile switch which is disposed in the second case and serves as a radio frequency (RF) input/output (I/O) port for the wireless communication unit; and an antenna connection cable which is formed in one body with the antenna and includes a connector formed at one end of the antenna connection cable, the antenna connection able being connected to the mobile switch via the connector.

According to another aspect of the present invention, there is provided a mobile terminal having a body including a first case in which an antenna is disposed and a second case in which a wireless communication unit is disposed, the mobile terminal including a first socket which is connected to the antenna and is exposed on one side of the first case; and a second socket which is formed in the second case and is connected to the wireless communication unit, wherein, when the first and second cases are coupled so as to form the body, the first and second sockets face each other and connect the antenna and the mobile switch.

According to another aspect of the present invention, there is provided an antenna connection device including a socket which is coupled to a mobile switch formed on a substrate of a mobile terminal; and an antenna connection cable which has one end connected to an antenna and the other end connected to the socket and is formed in one body with a case in which the antenna is buried.

According to another aspect of the present invention, there is provided a mobile terminal having an antenna and a mobile switch spaced apart from each other, the mobile terminal including a mobile switch; a connector which is formed in one body with the antenna, corresponds to the mobile switch, and includes a connection groove for coupling the connector to a test connector; and an antenna connection cable which forms a connection path between the test connector and the mobile switch when the test connector is inserted into the connection groove.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device.

Figure 1:
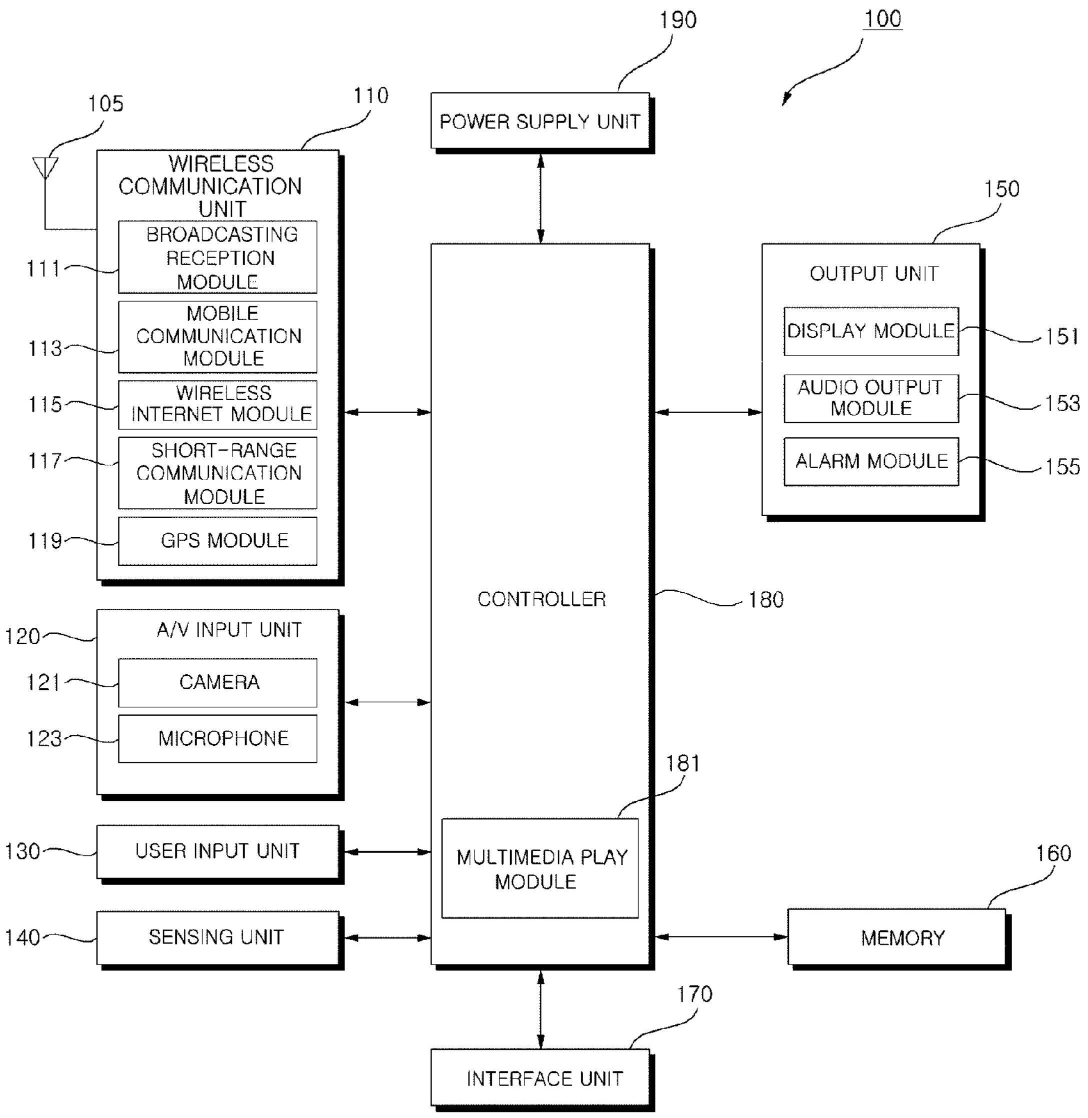
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device.

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The output unit 150 may output audio signals, video signals and alarm signals. The output unit 150 may include the display module 151, and an audio output module 153, an alarm module 155.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is detected, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display; a three-dimensional (3D) display and a transparent display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may generate vibration upon receiving a call signal or a message. In addition, the alarm module 155 may receive a key signal and may generate vibration as feedback to the key signal. Therefore, the user may be able to easily recognize the occurrence of an event based on vibration generated by the alarm module 155. An alarm signal for notifying the user of the occurrence of an event may be output not only by the alarm module 155 but also by the display module 151 or the audio output module 153.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to the other components in the mobile terminal 100.

The exterior of the mobile terminal 100 will hereinafter be described in detail with reference to FIGS. 2 and 3. For convenience, assume that the mobile terminal 100 is a bar-type mobile terminal equipped with a full-touch screen. However, the present invention is not restricted to a bar-type mobile terminal. Rather, the present invention can be applied to various mobile phones, other than a bar-type mobile terminal.

Figure 2:
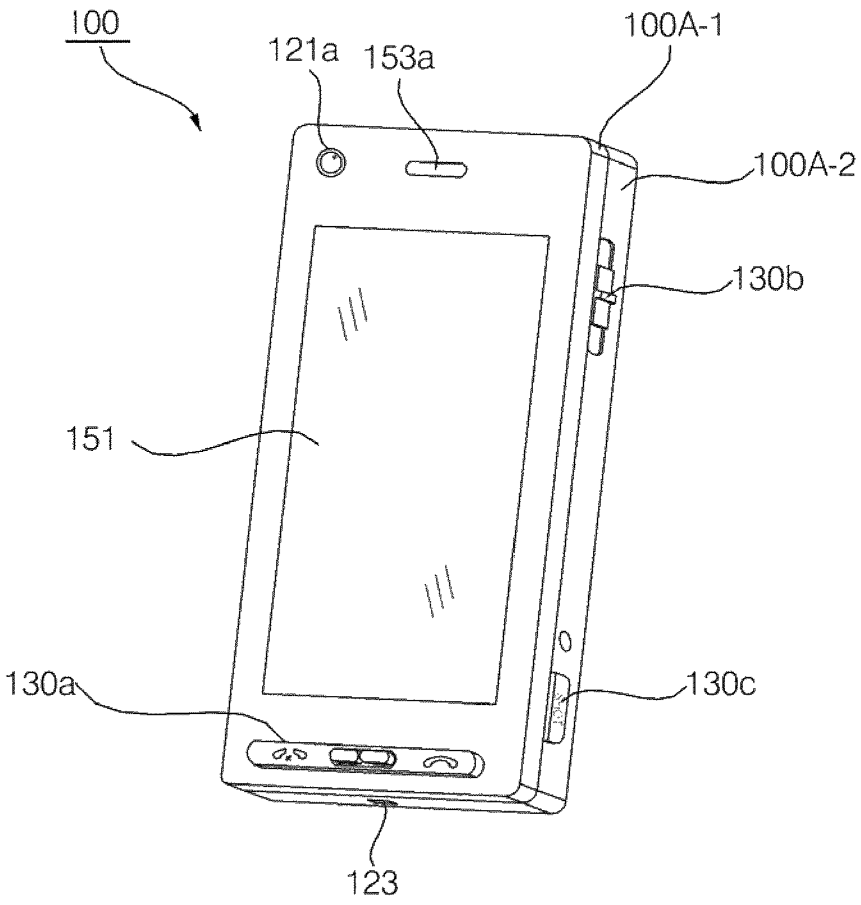
FIG. 2 illustrates a front perspective view of an example of the mobile terminal shown in FIG. 1.

FIG. 2 illustrates a front perspective view of an example of the mobile terminal 100 shown in FIG. 1. Referring to FIG. 2, the exterior of the first body 100A may be defined by a front case 100A-1 and a rear case 100A-2. Various electronic devices may be installed in the space formed by the front case 100A-1 and the rear case 100A-2. At least one intermediate case may be additionally provided between the front case 100A-1 and the rear case 100A-2. The front case 100A-1 and the rear case 100A-2 may be formed of a synthetic resin through injection molding. Alternatively, the front case 100A-1 and the rear case 100A-2 may be formed of a metal such as stainless steel (STS) or titanium (Ti).

The display module 151, a first audio output module 153*a*, a first camera 121*a* and a first user input unit 130*a* may be disposed in the front case 100A-1. A second audio output module (not shown) may also be disposed in the front case 100A-1. The second audio output module may provide a stereo function along with the first audio output module 153*a*, or may be used during a speakerphone mode.

An antenna for receiving a call and an antenna for receiving a broadcast signal may be disposed on one side of the front case 100A-1. The antennas may be installed so as to be able to be ejected from the front case 100A-1.

Second and third user input units 130*b* and 130*c* and the microphone 123 may be disposed on one side of the rear case 100A-2.

Examples of the display module 151 include an LCD and an OLED which can visualize information. Since a touch pad is configured to overlap the display module 151 and thus to form a layer structure, the display module 151 may serve as touch screens. Thus, it is possible for the user to input various information to the mobile terminal 100 simply by touching the display module 151.

The first audio output module 153*a* may be implemented as a receiver or a speaker. The first camera 121*a* may be configured to capture a still image or a moving image of the user. The microphone 123 may be configured to properly receive the user's voice or other sounds.

The first through third user input units 130*a* through 130*c* may be collectively referred to as the user input unit 130. The user input unit 130 may adopt various manipulation methods as long as it can offer tactile feedback to the user.

For example, the user input unit 130 may be implemented as a dome switch or a touch pad which receives a command or information upon being pushed or touched by the user. Alternatively, the user input unit 130 may be implemented as a wheel, a jog dial, or a joystick.

The first user input unit 130*a* may allow the user to input commands (such as 'start', 'end', and 'send'), the second user input unit 130*b* may be used to switch from one operating mode to another, and the third user input unit 130*c* may be used as a hot key for activating certain functions of the mobile terminal 100.

Figure 3:
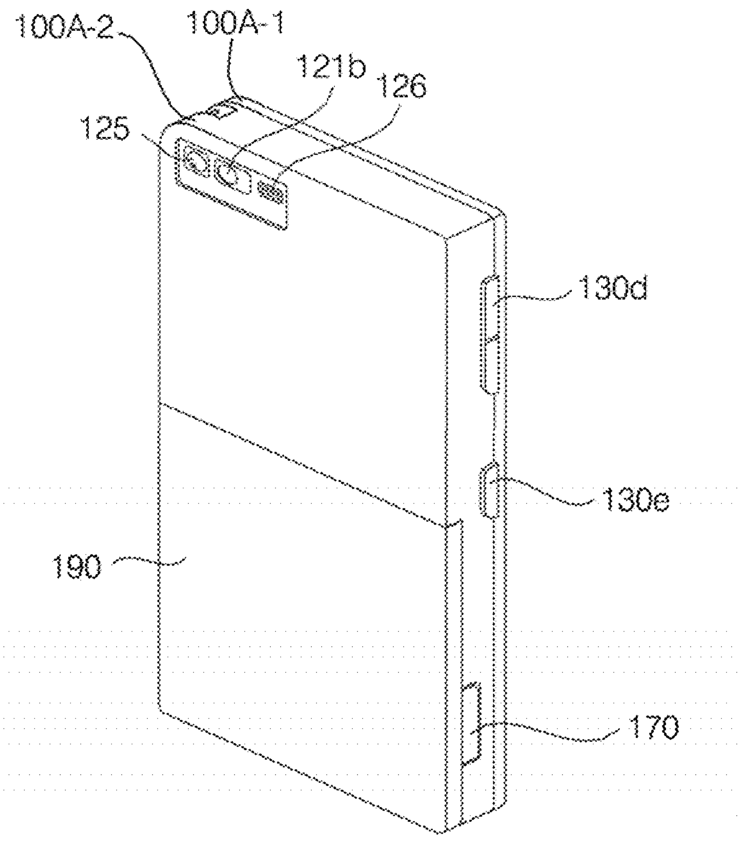
FIG. 3 illustrates a rear perspective view of the mobile terminal shown in FIG. 2.

FIG. 3 illustrates a rear perspective view of the mobile terminal 100 shown in FIG. 2. Referring to FIG. 3, a fourth user input unit 130*d*, a fifth user input unit 130*e* and the interface unit 170 may be disposed on one side of the rear case 100A-2, and a second camera 121*b* may be disposed at the rear of the rear case 100A-2.

The second camera 121*b* may have a different photographing direction from that of the first camera 121*a* shown in FIG. 2. In addition, the first and second cameras 121*a* and 121*b* may have different resolutions. For example, the first camera 121*a* may be used to capture and then transmit an image of the face of the user during a video call. Thus, a low-resolution camera may be used as the first camera 121*a*. The second camera 121*b* may be used to capture an image of an ordinary subject. In this case, the image captured by the second camera 121*b* may not need to be transmitted. Thus, a high-resolution camera may be used as the second camera 121*b*.

A mirror 125 and a cameral flash 126 may be disposed near the second camera 121*b*. The mirror 125 may be used for the user to prepare himself or herself for taking a self shot. The cameral flash 126 may be used to illuminate a subject when the user attempts to capture an image of the subject with the second camera 121*b*.

The interface unit 170 may serve as a path for allowing the mobile terminal 100 to exchange data with an external device. For example, the interface unit 170 may be a connector for connecting an earphone to the mobile terminal 100 in an either wired or wireless manner, a port for short-range communication or a power supply port for supplying power to the mobile terminal 100. The interface unit 170 may be a card socket for accommodating an exterior card such as a SIM or UIM card or a memory card.

The second camera 121*b* and the other elements that have been described as being provided on the rear case 100A-2 may be provided on the front case 100A-1.

In addition, the first camera 121*a* may be configured to be rotatable and thus to cover the photographing direction of the second camera 121*b*. In this case, the second camera 121*b* may be optional.

The power supply unit 190 may be disposed in the rear case 100A-2. The power supply unit may be a rechargeable battery and may be coupled to the rear case 100A-2 so as to be attachable to or detachable from the rear case 100A-2.

Figure 4:
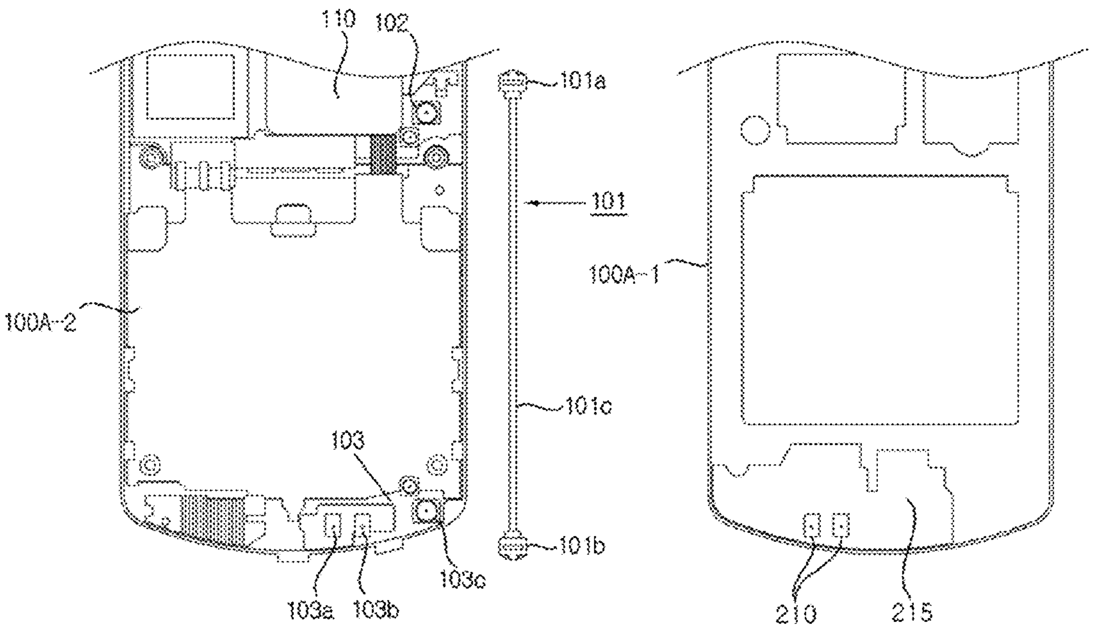
FIG. 4 illustrates an antenna connection cable for use in a typical bar-type mobile terminal and how the antenna connection cable is connected to the typical bar-type mobile terminal.

FIG. 4 illustrates a typical antenna connection cable 101 for use in a typical bar-type mobile terminal, i.e., the mobile terminal 100, and how the antenna connection cable 101 can be connected to the mobile terminal 100. Referring to FIG. 4, the antenna connection cable 101 may include a coaxial cable 101*c* and two connectors 101*a* and 101*b* disposed at either end of the coaxial cable 101*c*. The antenna connection able 101 may connect mobile switches 102 and 103*c*, which are disposed in the rear case 100A-2, and may thus connect an antenna 215, which is disposed in the rear case 100A-2, to the wireless communication unit 110.

The antenna 215 may be formed in a frame that can be attached to or detached from an end of the front case 100A-1, and may include a terminal 210 for contacting metal contacts 103*a* and 103*b* on the front case 100A-1. The structure of the antenna 215 will hereinafter be described in further detail with reference to FIG. 5.

Figure 5:
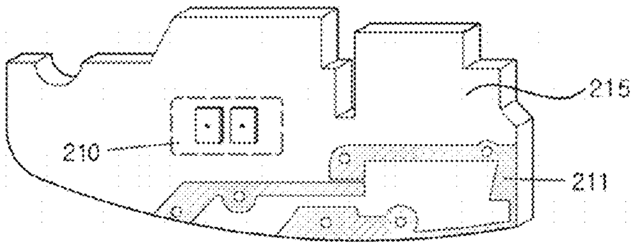
FIG. 5 illustrates the structure of the antenna shown in FIG. 4.

Referring to FIG. 5, when the front case 100A-1 and the rear case 100A-2 are coupled together so as to form the body of the mobile terminal 100, the terminal 210 may be placed in contact with a feeding point 103. The feeding point 103 may include the metal contacts 103*a* and 103*b* and the mobile switch 103*c*. The mobile switch 103*c* may be connected to the antenna connection cable 101, and may thus be connected to the mobile switch 102 via the antenna connection cable 101. The mobile switch 102 may be connected to the wireless communication unit 110, which is disposed on a substrate.

In short, the antenna 215 may be connected to the feeding point 103 via the terminal 210, the mobile switch 103*c* of the feeding point 103 may be connected to the connector 101*b* of the antenna connection cable 101, and the connector 101*a* of the antenna connection cable 101, which is connected to the mobile switch 103*c*, may be connected to the antenna 215 and the wireless communication unit 110 by being connected to the mobile switch 102, which is disposed on the substrate.

The mobile switches 102 and 103*c* may be able to be attached to or detached from the connectors 101*a* and 101*b*, respectively. When the mobile switches 102 and 103*c* are connected to the connectors 101*a* and 101*b*, respectively, insertion loss may be generated. When the terminal 210 contacts the metal contacts 103*a* and 103*b* of the feeding point 103, contact resistance may be generated. Table 1 shows insertion loss measurements obtained from the connectors 101*a* and 10*b* at various frequencies.

TABLE 1

| | ITEM | TEST METHOD | | | REQUIREMENTS |
|---|---|---|---|---|---|
| 1 | RATED VOLTAGE | | | | 30 Vr.m.s. |
| 2 | CHARACTERISTIC IMPEDANCE | | | | 50 Ω |
| 3 | VOLTAGE STANDING WAVE RATIO (V.S.W.R) | 45 MHz~3 GHz | V.S.W.R | | 1.3 MAX |
| 4 | INSERTION LOSS | 1 GHz<br>2 GHz<br>3 GHz | INSERTION LOSS | | 0.2 dB (typ)<br>0.3 dB (typ)<br>0.45 dB (typ) |
| 5 | INSULATION RESISTANCE | 100 V DC. FOR 1 min.<br>CENTER CONTACT-OUTER CONTACT | | | 500 MΩ MIN |
| 6 | VOLTAGE PROOF | 200 V AC. FOR 1 min.<br>CENTER CONTACT-OUTER CONTACT | | | NO FLASHOVER OR BREAKDOWN. |
| 7 | CONTACT RESISTANCE | OPEN CIRCUIT: 1 kHz<br>TEST CURRENT: [10 mA MAX] | | CENTER CONTACT<br>OUTER CONTACT | 20 mΩ MAX<br>10 mΩ MAX |

Referring to Table 1, when the frequency of signals passing through the connectors 101*a* and 101*b* is 1 GHz, an insertion loss of about −0.28 db may be generated. On the other hand, when the frequency of signals passing through the connectors 101*a* and 101*b* is 2 GHz, an insertion loss of about −0.37 db may be generated. The more connectors and mobile switches are provided between the antenna 215 and the mobile switch 102, the more the insertion loss becomes.

In addition, since a metallic material for bonding the mobile switch 103*c* to the feeding point 103 in order to mount the mobile switch 103*c* on the feeding point 103 is different from the material of the metal contacts 103*a* and 103*b* and the material of the mobile switch 103*c*, additional resistance may be generated.

Therefore, the greater the number of elements provided between the terminal 210 of the antenna 215 and the mobile switch 102, the greater the number of connection paths and the more the insertion loss. In addition, propagation loss may increase due to the additional resistance generated by the metallic material for bonding the mobile switch 103*c* to the feeding point 103.

Moreover, the complicated connection between the connector 121 and the mobile switch 102 may decrease the physical reliability of the antenna connection cable 101 and increase the manufacturing cost of the mobile terminal 100.

Figure 6:
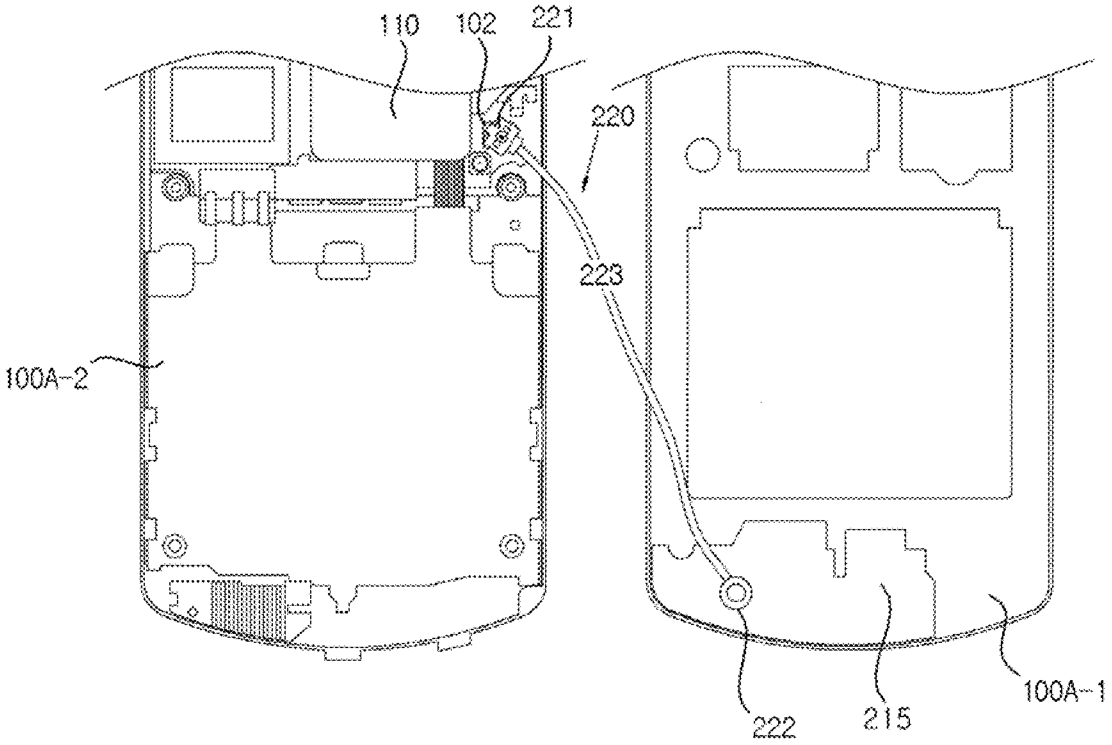
FIG. 6 illustrates an antenna connection cable according to an exemplary embodiment of the present invention and a mobile terminal having the antenna connection cable.

FIG. 6 illustrates an antenna connection cable 220 according to an exemplary embodiment of the present invention. Referring to FIG. 6, the antenna connection cable 220 may be formed in one body with an antenna 215, which is disposed in the front case 100A-1.

The antenna connection cable 220 may include a connector 221, which can be attached to or detached from a mobile switch 102 disposed in the rear case 100A-2, a coaxial cable 223, and a node 222, which is formed in one body with the antenna 215. The node 222 may be directly bonded to an antenna pattern (not shown), or may extend from the antenna pattern 211. In the latter case, the node 222 may be formed of the same material as that of the antenna pattern. The node 222 may be connected to the coaxial cable 223. The connector 221 may be connected to an end of the coaxial cable 223. Thus, the antenna 215 does not need any feeding point for connecting the antenna 215 to the wireless communication unit 110 or any metal contacts for placing a feeding point in contact with the antenna 215. Therefore, the antenna connection cable 220, unlike a typical antenna connection cable, may not cause contact resistance and may reduce insertion loss.

Since the antenna connection cable 220 and the antenna 215 are formed in one body with each other, they are always coupled to each other, and this will hereinafter be described in further detail with reference to FIG. 7.

Figure 7:
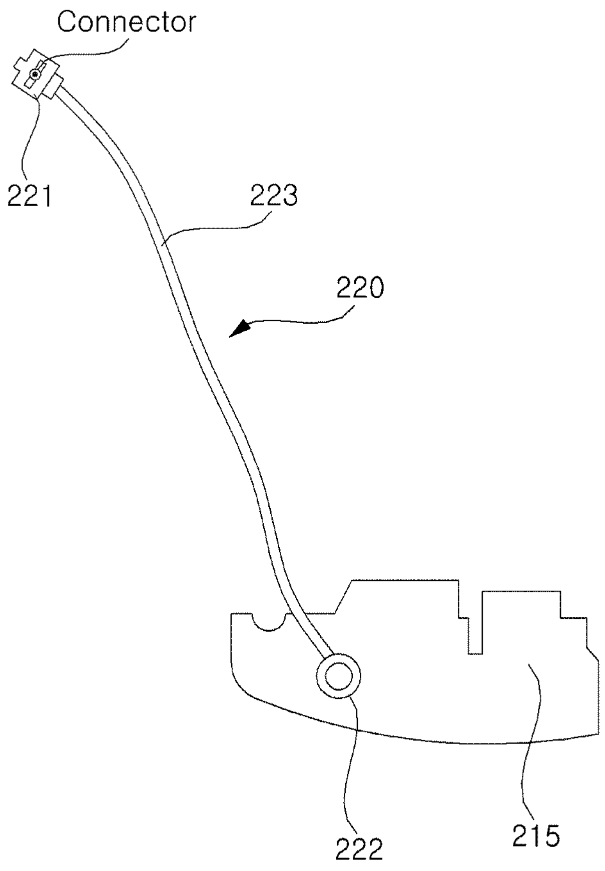
FIG. 7 illustrates the structure of the antenna connection cable shown in FIG. 6.

Referring to FIG. 7, the antenna connection cable 220 may be formed in one body with the antenna 215. The antenna connection cable 220 may be connected to the front case 100A-1 via the node 222, and may be attached to the antenna 215. The node 222 may be exposed on the surface of the antenna 215 or may be buried in the antenna 215, and particularly, in the front case 100A-1.

If the node 222 is embedded in the front case 100A-1, the coaxial cable 223 may be at least partially buried in the front case 100A-1, and may thus be able to be firmly coupled to the antenna 215. The antenna connection cable 220 may be able to simplify the connection path between the antenna 215 and the connector 221 regardless of whether the node 222 is buried in the antenna 215, whereas, referring to FIG. 4, the antenna connection cable 110 provides a connection path involving a plurality of connection nodes such as the metal contacts 210, the feeding point 103, the mobile switch 103*c*, the connector 101*b*, the coaxial cable 101*c*, the connector 101*a*, and the mobile switch 102.

The simplification of the connection path between the antenna 215 and the connector 221 may reduce insertion loss caused by the mobile switch 102, additional resistance caused by the use of different metallic materials for bonding and contact resistance generated between the antenna 215 and the contact points 103*a* and 103*b*.

In the exemplary embodiment of FIGS. 6 and 7, there is no need to provide a feeding point in the mobile terminal 100. In addition, it is possible to reduce the number of mobile switches required in the mobile terminal 100 and thus to reduce the manufacturing cost of the mobile terminal 100. Moreover, it is possible to efficiently use the space in the front case 100A-1.

Referring to FIG. 7, the connector 221 may include a connection groove. The connection groove may be provided for connecting the mobile terminal 100 to a test connector for RF calibration purposes, and particularly, for selectively connecting the mobile switch 102 to one of the antenna 215 and a test connector (not shown). RF calibration is a process for adjusting the RF output of each RF element in consideration of their properties. For this, the mobile terminal 100 may include a mobile switch 224 for RF calibration. If the connector 221 is designed to have a connection groove via which a test connector can be connected to the mobile switch 102, only one mobile switch (i.e., the mobile switch 102) may be enough to serve both purposes: RF calibration and antenna connection. The connection groove of the connector 102 will be described later in further detail with reference to FIGS. 10 and 11.

Figure 8:
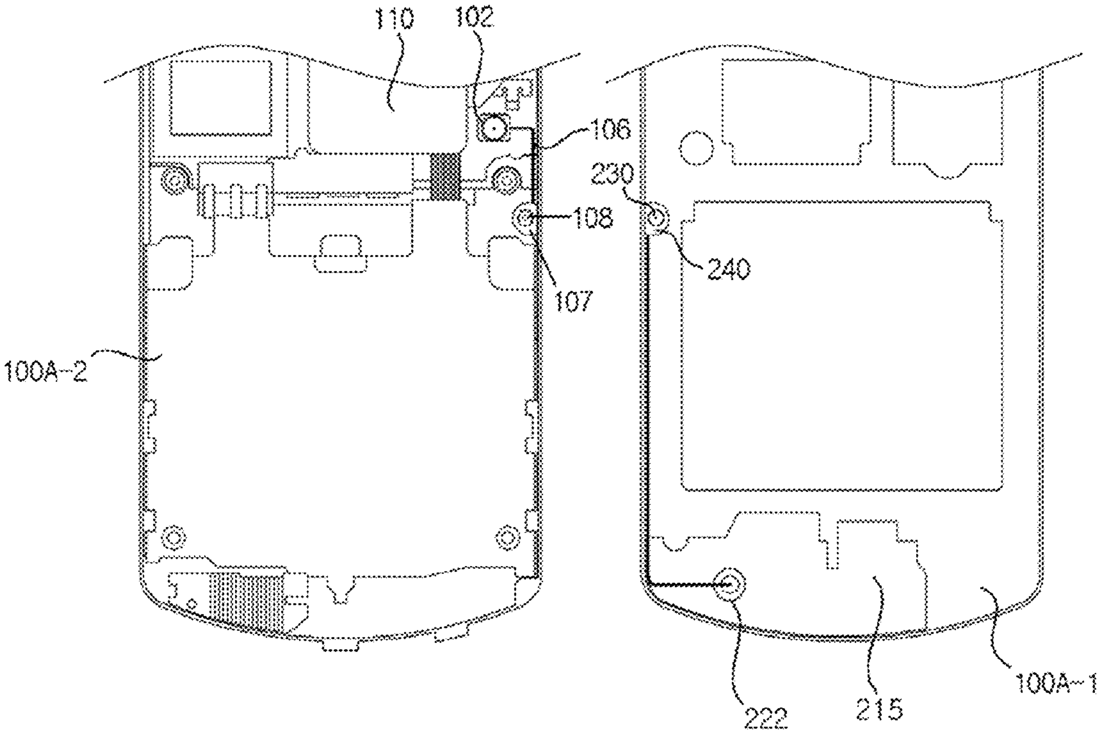
FIG. 8 illustrates an antenna connection cable according to another exemplary embodiment of the present invention and a mobile terminal having the antenna connection cable.

FIG. 8 illustrates an antenna connection cable according to an exemplary embodiment of the present invention. Referring to FIG. 8, when the front case 100A-1 and the rear case 100A-2 are coupled together so as to form the body of the mobile terminal 100, sockets 107 and 240 may face each other and may establish a path of transmission of signals between an antenna 215 and the wireless communication unit 110.

One of the sockets 107 and 240 may be a male socket, and the other socket may be a female socket. In this exemplary embodiment, the socket 240, which is disposed at the front case 100A-1, may be a male socket, and the socket 107, which is disposed at the rear case 100A-2, may be a female socket.

The socket 240 may be connected to a node 222 of the antenna 215 via a cable 223. The cable 223 may be a coaxial cable. The cable 223 may be connected to the socket 230 along the inner side of the front case 100A-1. More specifically, the cable 223 may be bonded onto the inner side of the front case 100A-1, may be arranged along the inner side of the front case 100A-1 or may be buried in the front case 100A-1.

Figure 9:
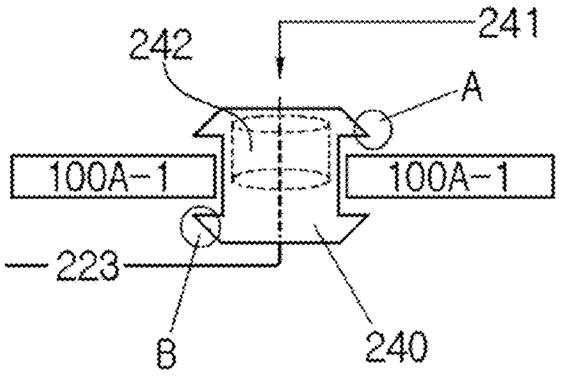
FIG. 9 illustrates how a socket can be fixed to a front case of a mobile terminal.

The socket 240 may be fixed to the front case 100A-1 using a number of supporting elements, as shown in FIG. 9. The supporting elements may be formed of the same plastic material as that of the front case 100A-1 or may be formed of a metal, such as titanium, stainless steel, or aluminum.

FIG. 9 illustrates how to fix the socket 240 to the front case 100A-1. Referring to FIG. 9, the socket 240 may be inserted and fixed into a hole formed in the front case 100A-1. For this, rings A and B may be provided at the hole of the front case 100A-1. The rings A and B may have arrow-shaped tips. Thus, once inserted into the hole of the front case 100A-1, the socket 240 may not be able to be easily disengaged from the front case 100A-1 due to the rings A and B. If the socket 240 is a male socket, a connector of the cable 223) may be inserted into a space 242, and a connector protrusion of the cable 223, which is formed of a metallic material, may be exposed at a location 241 The socket 107 may be fixed to the rear case 100A-2 in the same manner as that used to fix the socket 240 to the front case 100A-1. The sockets 107 and 240 must face each other when the front case 100A-1 and the rear case 100A-2 are coupled together. In this exemplary embodiment, when the front case 100A-1 and the rear case 100A-2 are coupled together, the antenna 215 and the wireless communication unit 110 may be coupled together.

Figure 10:
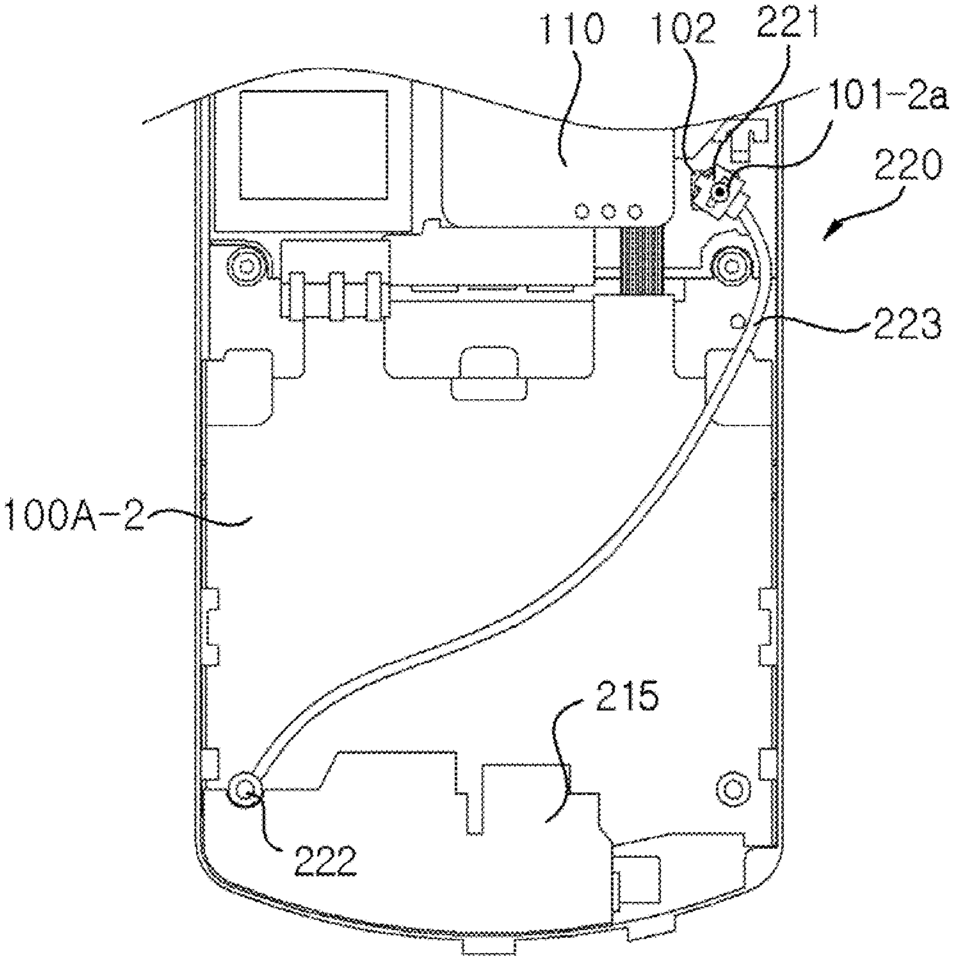
FIG. 10 illustrates an antenna connection cable according to another exemplary embodiment of the present invention and a mobile terminal having the antenna connection cable.

FIG. 10 illustrates an antenna connection cable according to an exemplary embodiment of the present invention. Referring to FIG. 10, an antenna 215 and the mobile switch 102 of the wireless communication unit 110 may be disposed in the rear case 100A-2. For a better reception of wireless signals, the antenna 215 may be disposed at an end of the rear case 100A-2.

A node 222 of the antenna 215 may be connected to the mobile switch 102 via a coaxial cable 223 and a connector 221. The connector 221 may include a connection hole 101-1*a* formed on one side of the connector 221. The connector 221 may be connected to a test connector (not shown) for RF calibration via the connection hole 101-1*a*.

The mobile switch 102 may have the same size and shape as those of typical mobile switches for RF calibration. Especially when the mobile terminal 100 is mounted on a printed circuit board (PCB), the mobile switch 102 may occupy space on the PCB and make it difficult to other elements to be mounted nearby. In this exemplary embodiment, the wireless communication unit 110 may be selectively connected to the antenna 215 and a test cable (not shown) using a single mobile switch, i.e., the mobile switch 102, on the contrary to a typical mobile terminal equipped with two mobile switches.

Figure 11:
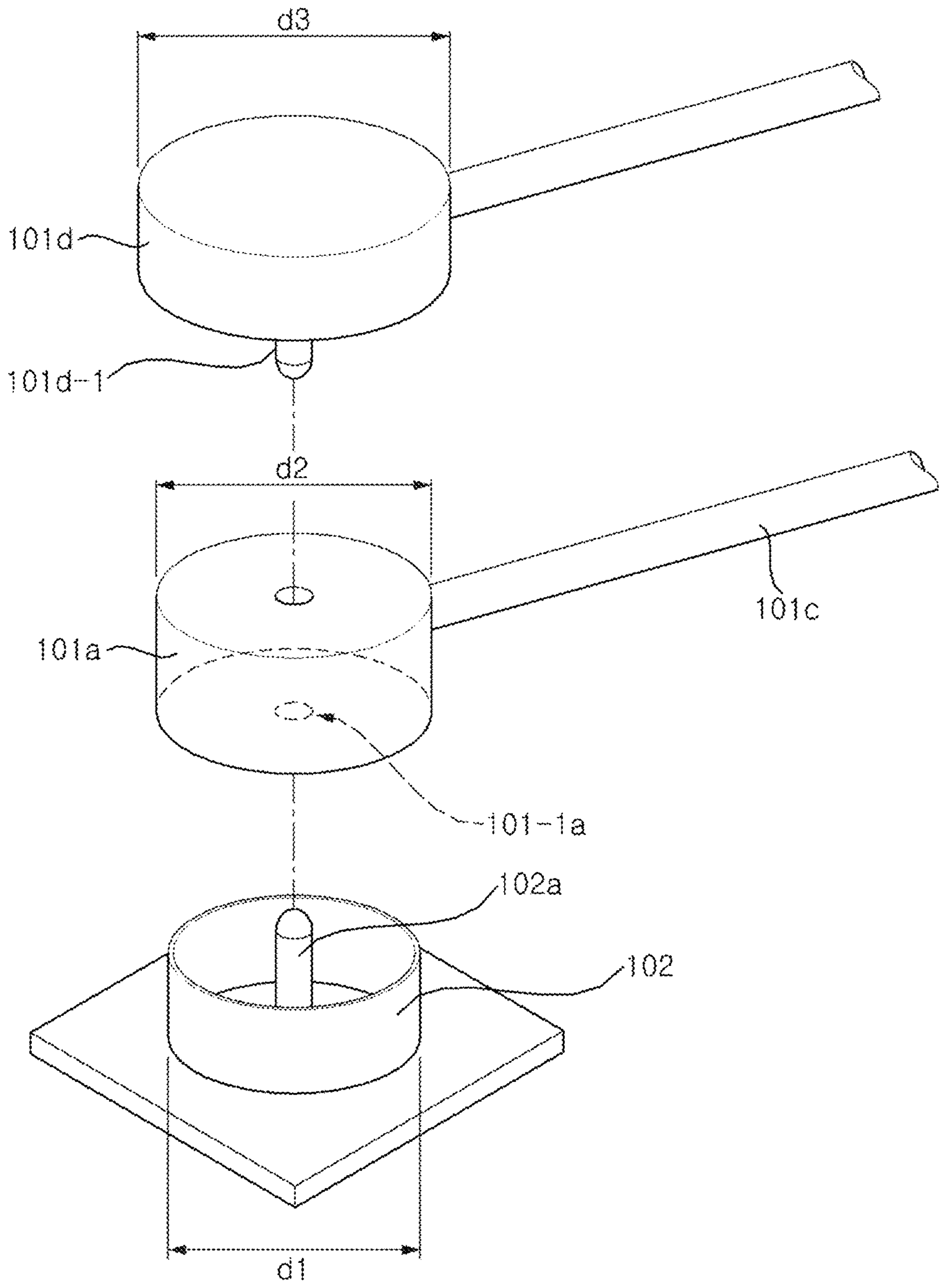
FIG. 11 illustrates perspective views of a test connector, a connector and a mobile switch.

FIG. 11 illustrates perspective views of a test connector 101*d*, a connector 101*a* and a mobile switch 102. Referring to FIG. 11, the connector 101*a* may be connected to the test connector 101*d* and the mobile switch 102.

The connector 101*a* may include a connection hole 101-1*a*, which is formed through the connector 101*a* and faces both the test connector 101*d* and the mobile switch 102.

The connector 101*a* may be connected to the mobile switch 102, and may thus be able to form a connection path between the antenna 215 and the mobile switch 102.

Thereafter, the connector 101*a* may be connected to the test connector 101*d* via the connection hole 101-1*a*, and may thus be able to form a connection path between the test connector 101*d* and the wireless communication unit 110.

That is, the connector 101*a* may selectively connect the antenna 215 and the test connector 101*d* to the wireless communication unit 110 according to whether the test connector 101*d* is connected there to. It will hereinafter be described in detail how the connector 101*a* sets a connection path with reference to FIG. 12.

Figure 12:
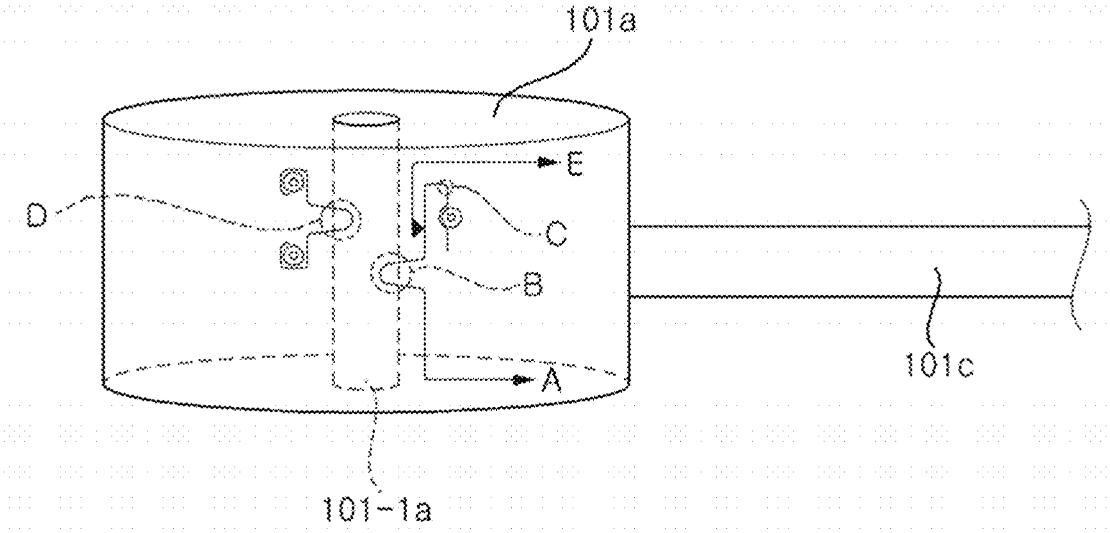
FIG. 12 illustrates how to set a connection path with the use of a connector.

FIG. 12 illustrates how to set a connection path with the use of the connector 101*a*. Referring to FIG. 12, the connector 101*a* may include an elastic element D, a first contact element B and a second contact element C. When a protrusion 101*d*-1 of the test connector 101*d* is inserted into the connection hole 101-1*a*, the elastic element D may force the protrusion 101*d*-1 into the first contact element B and may thus maintain the protrusion 101*d*-1 to be electrically connected to the first contact element B.

The first contact element B may be maintained to be electrically connected to the second contact element C until the protrusion 101*d*-1 of the test connector 101*d* is inserted into the connection hole 101-1*a*. That is, the first contact element B may be electrically disconnected from the second contact element C when protrusion 101*d*-1 of the test connector 101*d* is inserted into the connection hole 101-1*a*.

When connected to a protrusion 102*a* of the mobile switch 102 via the connection hole 101-1*a*, the connector 101*a* may provide a connection path between the antenna 215 and the mobile switch 102 via the cable 101*c*.

In this case, if the test connector 101*d* is connected to the connector 101*a* via the connection hole 101-1*a*, the first and second contact elements B and C may be electrically disconnected, and the connector 101*a* may provide a connection path between the test connector 101*d* and the mobile switch 102.

In order to properly couple the mobile switch 102, the connector 101*a*, and the test connector 101*d* to one another, diameters d1, d2 and d3 of the mobile switch 102, the connector 101*a*, and the test connector 101*d* may be set to satisfy the following equation: d3>d2>d1.

The details set forth herein regarding the test connector 101*d* can directly apply to the exemplary embodiments of FIGS. 4 through 7.

According to the present invention, it is possible to reduce the number of connection paths between an antenna and a wireless communication unit of a mobile terminal and thus to minimize path loss. In addition, it is possible to reduce the number of mobile switches provided between the antenna and the wireless communication unit and thus to minimize insertion loss. Moreover, it is possible to simplify an antenna connection device for coupling the antenna to the mobile terminal by burying the antenna connection device in a housing of the mobile terminal where the antenna is buried. Therefore, it is possible to improve the reliability of the mobile terminal and reduce the manufacturing cost of the mobile terminal.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile terminal, comprising:

a body comprising:

a first case including an antenna, and a second case including a wireless communication unit;

a mobile switch included in the second case and configured to serve as a radio frequency (RF) input/output (I/O) port for the wireless communication unit; and an antenna connection cable formed in the body and comprising a cable, a connector coupled at one end of the cable, and a node formed in one body with an antenna pattern of the antenna coupled at another end of the cable, wherein the connector of the antenna connection cable connects directly to the mobile switch, wherein the node of the antenna connection cable is embedded in the first case and is formed of a same material as the antenna pattern, wherein the antenna comprises a frame that is attached to and detachable from the first case, wherein the frame comprises the antenna pattern, wherein the connector includes a connection groove configured to couple the connector to a test connector;

wherein the connector is configured to provide a connection path between the antenna and the mobile switch when the connector is connected to the mobile switch and is not connected to the test connector;

wherein the connector is further configured to provide a connection path between only the test connector and the mobile switch when the connector is connected to both the mobile switch and the test connector; and wherein the connector is further configured to not provide a connection path between the antenna and the mobile switch at any time when the connector is connected to both the mobile switch and the test connector.

2. The mobile terminal of claim 1, wherein at least a portion of the cable of the antenna connection cable is embedded in the first case.

3. The mobile terminal of claim 1, wherein the cable of the antenna connection cable comprises a coaxial cable.

4. A mobile terminal, comprising:

a body comprising:

a first case, and a second case including an antenna, a wireless communication unit and a mobile switch spaced away from the antenna; and an antenna connection cable formed in the second case and comprising a cable, a connector coupled at one end of the cable, and a node formed in one body with an antenna pattern of the antenna coupled at another end of the cable, wherein the connector of the antenna connection cable connects directly to the mobile switch, wherein the node of the antenna connection cable is embedded in the second case and is formed of a same material as the antenna pattern, wherein the connector comprises a connection groove configured for coupling the connector to a test connector, wherein the connector is configured to provide a connection path between the antenna and the mobile switch when the connector is connected to the mobile switch and is not connected to the test connector, wherein the connector is further configured to provide a connection path between only the test connector and the mobile switch when the connector is connected to both the mobile switch and the test connector; and wherein the connector is further configured to not provide a connection path between the antenna and the mobile switch at any time when the connector is connected to both the mobile switch and the test connector.

* * * * *